United States Patent [19]

New

[11] 3,828,223
[45] Aug. 6, 1974

[54] PROCESS AND APPARATUS FOR VARYING THE POSITION OF THE ARC ROOT IN A PLASMA ARC SUITABLE FOR PRODUCING TITANIUM DIOXIDE PIGMENTS

[75] Inventor: George William New, Teesside, England

[73] Assignee: British Titan Limited, Billingham, England

[22] Filed: Aug. 30, 1972

[21] Appl. No.: 284,889

[30] Foreign Application Priority Data
Nov. 2, 1971  Great Britain .................... 50823/71

[52] U.S. Cl. ................. 315/267, 204/164, 315/343, 315/344, 315/348, 423/613
[51] Int. Cl. .......................................... H05b 41/16
[58] Field of Search ........... 315/267, 343, 344, 348; 313/153, 154, 156, 160, 161; 204/164; 423/613

[56] References Cited
UNITED STATES PATENTS
3,059,149  10/1962  Sausbury ........................ 315/348 X
3,381,171  4/1968  Kienast ........................... 315/344 X
3,558,274  1/1971  Holden ............................. 423/613
3,695,840  10/1972  Pfender ............................ 423/613

Primary Examiner—Herman Karl Saalbach
Assistant Examiner—James B. Mullins
Attorney, Agent, or Firm—Schuyler, Birch, Sindler, McKie & Beckett

[57] ABSTRACT

An improved device and processes for prolonging the operating life of electrodes, for example in the production of $TiO_2$, comprising the provision around the electrode of a field coil consisting of a primary coil and a number of secondary coils and means to divert power from one or more of the secondary coils to the remaining coils while maintaining the flux strength of the magnetic field in the remaining coils thus varying the position of the arc root on the electrode surface.

13 Claims, 1 Drawing Figure

PATENTED AUG 6 1974 3,828,223
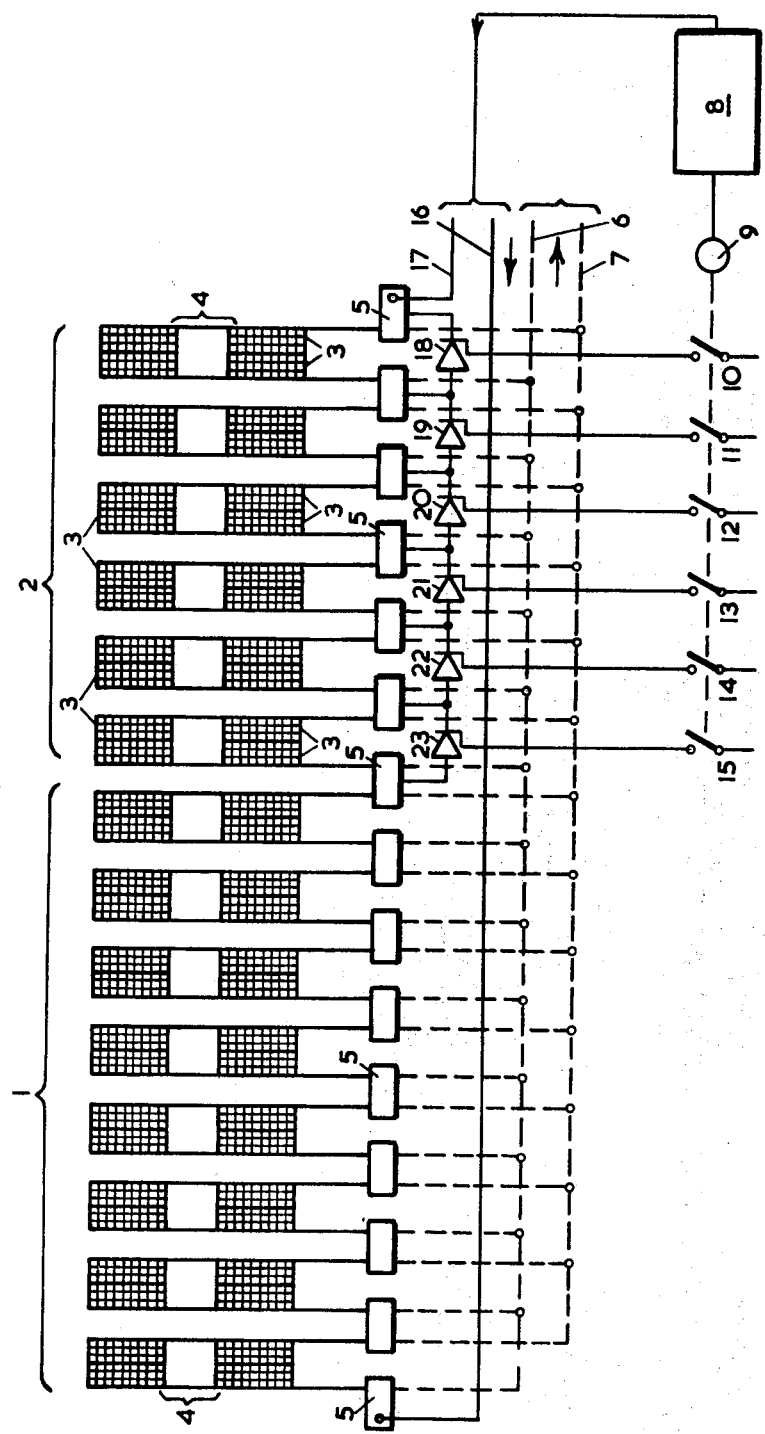

PROCESS AND APPARATUS FOR VARYING THE POSITION OF THE ARC ROOT IN A PLASMA ARC SUITABLE FOR PRODUCING TITANIUM DIOXIDE PIGMENTS

The present invention relates to a process for prolonging the life of electrodes between which an arc is maintained, for example in a plasma gun, and to apparatus for achieving this.

In any device in which an arc is maintained between electrodes for a substantial period of time erosion of one or both electrodes occurs and, ultimately, one or both electrodes become unsuitable for further operation. If the arc is to be maintained after this point, it is normally necessary to cease operation and renew one or both electrodes.

One such an operation in which an arc is maintained between electrodes is the use of a plasma gun to supply heat for a subsequent chemical reaction, for example in the heating of an inert gas or one or both reactants, e.g. oxygen and/or titanium tetrahalide to provide the necessary heat to support the oxidation of a metal halide to its corresponding oxide, e.g. pigmentary titanium dioxide. Such a process is particularly advantageous in the oxidation of titanium tetrachloride to pigmentary titanium dioxide, for example as described in U.S. Pat. No. 3,501,262 and a process and apparatus such as that described in U.S. Pat. No. 3,448,333 is particularly suitable for use in conjunction with the process of the present invention although it is preferred to use coaxial tubular electrodes of silver/copper alloy. If the life of the electrode or electrodes can be prolonged this, of course, results in a substantial reduction in costs owing to reduced downtime of the plasma gun.

Accordingly, the present invention is a process for prolonging the operating life of electrodes between which an arc is maintained comprising providing around an electrode a field coil consisting of a primary coil and a number of secondary coils spaced along the electrode, the magnetic field of the primary and secondary coils determining the position of the arc root, at least under steady arc operating conditions and, while maintaining the arc, diverting power from one or more of the secondary coils to the remaining coils while maintaining the flux strength of the magnetic field of the remaining coils, thereby varying the position of the arc root upon the electrode surface.

The invention also comprises a device consisting of a field coil shaped to surround an electrode and having a primary coil and a number of secondary coils of similar shape spaced along the field coil and means for diverting power from one or more of the secondary coils to the remaining coils while maintaining the flux strength of the field coil.

The field coil consists of a number, for example, from 6 to 20 coils and it has found very convenient to form each coil from two subcoils placed side by side and interconnected in such a way that the current flows through both subcoils in the same direction; the two outer ends of the coil being secured to connecting blocks through which coolant may be introduced and withdrawn from each coil. Obviously, a single block may be used to transfer coolant to and from adjacent coils, the coolant passing from one coil to the coolant manifold via passages in the block.

One very suitable field coil consists of 14 coils (some of which form the primary coil) of similar size placed side by side and enclosed and retained in position by end plates of suitable material, normally insulating material, and forming with the end plates a passage through the centre of the coils for the electrode to which the field is to be applied.

The whole assembly, i.e. the field coil consisting of primary coil and secondary coils, end plates and connecting blocks for power and coolant may conveniently be encased in epoxy resin and each turn of each coil, as is usual, is wound with insulating material to prevent current flow except through the length of the conducting material.

The secondary coils are each provided with means for diverting power from that coil to the remaining coils, i.e. with means to short out one or more of the secondary coils. The means to divert the power are preferably thyristors which are so connected between the secondary coils that when the thyristor is actuated the power supplied to associated secondary coil is diverted substantially instantaneously to the remaining coils. A thyristor is a known three terminal device capable of controlling high load power by trigger impulses to the base or gate terminal.

The power is normally diverted sequentially, i.e. one or more secondary coils at the end of the field coil adjacent the other electrode are shorted out and the power diverted to the remaining coils and this is repeated in turn as desired, but sequential switching is not essential and any secondary coil or coils in the field coil may be shorted out and the power diverted to the remaining coils whatever their position in the field coil.

The shorting out of the secondary coils is conveniently carried out automatically, for example by a sequence timer and associated trigger circuits, whereby a suitable power source is connected to the thyristor(s) to cause these to operate to short out the desired secondary coil or coils.

It has been found desirable to provide cooling for the thyristors as well as for the coils and one convenient method of providing this is to mount the thyristors upon a cooled metal block or blocks. Each thyristor is, of course, normally electrically insulated from the adjacent thyristors by suitable insulating material.

In order to maintain the magnetic flux of the remaining coils substantially constant (thereby ensuring the arc is maintained under control) when one or more of the secondary coils hve been shorted out it is necessary to increase the amount of current to the remaining coils. The increase in the current is preferably carried out by the same device which is used to activate the thyristor to short out the secondary coil and this is conveniently accomplished by providing means whereby the sequence timer for the thyristor(s) also operates a current control, for example to control a power pack, capable of providing currents of between 200 and 600 amps., to increase the current supplied to the remaining coils.

By the process of the present invention it is ensured that the point of greatest magnetic flux of the field coil moves axially along the electrode thereby causing the position of the arc root (i.e. the point where the end of the arc meets the electrode surface) to vary in position on the surface of the electrode. By this means excessive erosion of the electrode at one point by the arc root is avoided and erosion is spread over a larger area, thereby prolonging the operating life of the electrode.

The field coil is normally applied to the cathode since it is on this electrode that the most effective result can be obtained. However, field coils and the process of the present invention may be applied to the anode or to both the anode and the cathode, if desired, with advantage.

The frequency and number of operations of the thyristors to short out the secondary coils depends upon the total number of secondary coils, the length of the electrode and the amount of erosion taking place, among other factors and is difficult to define for all conditions.

The attached FIGURE shows diagrammatically one embodiment of the invention in which the field coil consists of a primary coil 1, secondary coils 2 (which can be shorted out) and subcoils 3.

A passage 4 is formed through the field coil to take the electrode (normally the cathode) which is not shown.

The combined coolant/power supply blocks 5 are supplied with coolant via pipe 6 and this is withdrawn via pipe 7.

Similarly, power (DC) is supplied via the current controller 8 which is actuated by sequence timer 9 (as are switches 10, 11, 12, 13, 14 and 15). The power from the current controller is supplied via conductors 16 and 17.

Thyristors 18, 19, 20, 21, 22 and 23 are connected between adjacent coolant/power supply blocks in such a manner that when one is actuated power is diverted to the remaining coils and the previous secondary coil (or coils if more than one thyristor is actuated) is shorted out. The thyristor is actuated by the sequence controller which closes the appropriate switch, to supply power from a secondary power source (not shown) to the thyristor.

In operation, the sequence timer operates switch 10 to actuate thyristor 18 thereby shorting out the right hand secondary coil (which is nearest to the other electrode and furthest from the distal end of the cathode). At the same time, the sequence timer operates the current controller to increase the current to the remaining coils to maintain the flux strength provided by the field coil. The point of maximum magnetic flux, and therefore, the position of the arc root is by this means moved axially to the left.

The process is repeated by actuating switches 11, 12, 13, 14 and 15 at the desired intervals of time until all six switches have been closed and their attendant thyristors actuated. At this stage the magnetic flux is supplied by the primary coil only and the point of maximum magnetic flux and, consequently, the arc root has moved a substantial distance to the left.

The erosion caused by the arc root is thus spread over a much larger area of the electrode surface than would be the case if the arc root had been maintained in one position on the electrode surface, and the operating life of the electrode is thus substantially prolonged. Preferably the initial current supply to the field coil lies in the range of about 400 to 450 amps. and the preferred magnetic flux generated by the coil is up to about 4.5 kiloGauss, for example one in the range of about 3.5 to 4.5 kiloGauss.

The following Example shows one method of carrying out the process of the present invention and apparatus therefor.

EXAMPLE

A field coil 18 inches outside diameter, 5 inches inside diameter and 12 inches long was constructed consisting of 14 coils, six of which were secondary coils and the remaining eight formed the primary coil. Each coil consisted of two subcoils containing 16 turns each of ⅜ inch square section copper tubing through which was a passage 0.21 inch diameter for coolant. The inner ends of the subcoils were connected in such a manner that the current flowed in the same direction in both subcoils. The outer ends of the coils were connected to combined coolant/power supply blocks forming the series connections for the field coil.

Between each power supply block for the 6 secondary coils were connected thyristors in such a manner that when each thyristor was actuated by a secondary power supply the associated secondary coil was shorted out and the power diverted to the remaining coils.

The thyristors were actuated by a sequence timer which also operated a current controller to increase the current supply to the remaining coils to maintain the magnetic flux provided by those coils.

One thyristor was operated at intervals of 10 days until the six secondary coils had been shorted out and the current supply had been increased in increments from an initial current of 460 amps. to 600 amps. giving a magnetic flux of about 3.85 kiloGauss.

During operation the field coil which was 12 inches long and enclosed a circular passage 5 inches diameter was placed over a hollow tubular cathode of a plasma gun of 4½ inches outside diameter and 18 inches in length. The cathode was closed at the distal end and an arc was maintained between the interior of the cathode and the interior of an opposing hollow tubular open ended anode of similar dimensions. A gas was introduced tangentially between the opposed faces of the anode and cathode of the plasma gun at high velocity before discharge as a luminous plasma from the distal open end of the anode.

During the period of operation of the thyristors to short out the six secondary coils the arc root was moved a total distance of about 5¾ inches long the cathode towards its distal end and the length of the operating life of the plasma gun (which is mainly determined by the rate of erosion of the cathode surface at the arc root) was increased by a factor of two when compared with that of a similar plasma gun provided only with a conventional field coil.

What is claimed is:

1. A process for prolonging the operating life of electrodes between which an arc is maintained comprising providing around an electrode a field coil consisting of a primary coil and a number of secondary coils spaced along the electrode, the magnetic fields of the primary and secondary coils determining the position of the arc root, at least under steady arc operating conditions, and, while maintaining the arc, diverting power from one or more of the secondary coils to the remaining coils while maintaining the flux strength of the magnetic field of the remaining coils thereby varying the position of the arc root upon the electrode surface.

2. A process as claimed in claim 1 wherein the power is diverted from one or more secondary coils to the remaining coils by the activation of a thyristor.

3. A process as claimed in claim 1 wherein the power is diverted from the secondary coil or coils to the remaining coils sequentially.

4. A process as claimed in claim 1 wherein the magnetic flux of the remaining coils is maintained by increasing the current to the remaining coils substantially instantaneously when the power is diverted from the secondary coil.

5. A process as claimed in claim 1 wherein the field coil is applied to the cathode.

6. An improved process for the production of pigmentary titanium dioxide in which a gas selected from the group oxygen, an inert gas or a titanium tetrahalide is passed through an arc maintained between electrodes wherein a field coil is provided around at least one of the electrodes consisting of a primary coil and a number of secondary coils spaced along the electrode, the magnetic fields of the primary and secondary coils determining the position of the arc root, at least under steady arc operating conditions and while maintaining the arc, diverting power from one or more of the secondary coils to the remaining coils while maintaining the flux strength of the magnetic field of the remaining coils thereby varying the position of the arc root on the electrode surface, and passing the gas heated by its passage through the arc into a reaction zone wherein a titanium tetrahalide is oxidised to pigmentary titanium dioxide, heat for the reaction being supplied by the arc heated gas.

7. A process as claimed in claim 6 wherein the arc-heated gas is oxygen.

8. A process as claimed in claim 6 wherein the titanium tetrahalide is titanium tetrachloride.

9. A device comprising a field coil shaped to surround an electrode, said field coil consisting of a primary coil and a number of secondary coils capable of being shorted out spaced along the field coil; means associated with said secondary coils for shorting out one or more of said secondary coils and diverting the power from said shorted secondary coils to the remaining coils of said field coil while maintaining the flux strength of said field coil.

10. A device as claimed in claim 9 wherein the field coil consists of a plurality of coils, each one of which is formed from two subcoils placed side by side and connected in such a manner that the current can flow through both subcoils in the same direction.

11. A device as claimed in claim 9 wherein the outer ends of the coils forming the field coil are secured to a connecting block through which coolant may be introduced and withdrawn from each coil.

12. A device as claimed in claim 9 wherein the means for diverting power from a secondary coil to the remaining coils is a thyristor.

13. A device as claimed in claim 12 further including apparatus which both initiates a power supply to actuate the thyristor and also actuates a current control to increase the current supply to the remaining coils.

* * * * *